United States Patent
Ahn et al.

(10) Patent No.: US 12,014,202 B2
(45) Date of Patent: Jun. 18, 2024

(54) METHOD AND APPARATUS WITH ACCELERATOR

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Jaehyung Ahn, Suwon-si (KR); Minsoo Rhu, Daejeon (KR); Yujeong Choi, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 818 days.

(21) Appl. No.: 17/119,197

(22) Filed: Dec. 11, 2020

(65) Prior Publication Data

US 2021/0256373 A1 Aug. 19, 2021

Related U.S. Application Data

(60) Provisional application No. 62/975,944, filed on Feb. 13, 2020.

(30) Foreign Application Priority Data

Jun. 30, 2020 (KR) .................. 10-2020-0080372

(51) Int. Cl.
*G06F 9/46* (2006.01)
*G06F 9/48* (2006.01)
(Continued)

(52) U.S. Cl.
CPC ............ *G06F 9/461* (2013.01); *G06F 9/485* (2013.01); *G06F 15/161* (2013.01); *G06N 3/04* (2013.01); *G06N 3/08* (2013.01)

(58) Field of Classification Search
None
See application file for complete search history.

(56) References Cited

U.S. PATENT DOCUMENTS 9,052,948 B2 6/2015 Munshi et al.
2008/0271029 A1 10/2008 Brenner et al.
(Continued)

FOREIGN PATENT DOCUMENTS

CN 101657795 A 2/2010
CN 101802789 A 8/2010
(Continued)

OTHER PUBLICATIONS

Smith, James E., and Andrew R. Pleszkun. "Implementation of precise interrupts in pipelined processors." *ACM SIGARCH Computer Architecture News* 13.3 (1985): 36-44.(9 pages in English).
(Continued)

*Primary Examiner* — Kaushikkumar M Patel
(74) *Attorney, Agent, or Firm* — NSIP Law

(57) ABSTRACT

A method of operating the accelerator includes receiving a request for preemption during an execution of a first task using one or more processing elements included in the accelerator, in response to the request for preemption, moving context information of the first task stored in an internal memory of the accelerator to an external memory of the accelerator, and executing a second task associated with the request for preemption using the processing elements.

21 Claims, 7 Drawing Sheets

(51) Int. Cl.
*G06F 15/16* (2006.01)
*G06N 3/04* (2023.01)
*G06N 3/08* (2023.01)

(56) References Cited

U.S. PATENT DOCUMENTS

| | | | |
|---|---|---|---|
| 2009/0049451 A1* | 2/2009 | Bates | G06F 9/461 |
| | | | 718/108 |
| 2017/0083998 A1* | 3/2017 | Acharya | G06T 1/60 |
| 2018/0004510 A1* | 1/2018 | Grochowski | G06F 9/3865 |
| 2018/0293102 A1* | 10/2018 | Ray | G06T 1/20 |
| 2018/0373562 A1* | 12/2018 | Roberts | G06T 1/20 |
| 2019/0146829 A1* | 5/2019 | Cheng | G06F 15/7871 |
| | | | 718/108 |
| 2019/0324856 A1* | 10/2019 | Zhao | G06F 18/2148 |
| 2019/0340014 A1 | 11/2019 | Fishel et al. | |
| 2019/0340490 A1 | 11/2019 | Fishel et al. | |
| 2019/0340491 A1 | 11/2019 | Norden et al. | |

FOREIGN PATENT DOCUMENTS

CN 102089752 A 6/2011
CN 108769254 A 11/2018

OTHER PUBLICATIONS

Capodieci, Nicola, et al. "Deadline-based scheduling for gpu with preemption support." 2018 *IEEE Real-Time Systems Symposium (RTSS)*. IEEE, 2018. (12 pages in English).

Park, Jason Jong Kyu, Yongjun Park, and Scott Mahlke. "Chimera: Collaborative preemption for multitasking on a shared GPU." *ACM SIGARCH Computer Architecture News* 43.1 (2015): 593-606. (14 pages in English).

Tanasic, Ivan, et al. "Enabling preemptive multiprogramming on GPUs." *ACM SIGARCH Computer Architecture News* 42.3 (2014): 193-204. (12 pages in English).

\* cited by examiner

METHOD AND APPARATUS WITH ACCELERATOR

CROSS-REFERENCE TO RELATED APPLICATIONS

This application claims the benefit under 35 U.S.C. § 119(e) of U.S. Provisional Application No. 62/975,944 filed on Feb. 13, 2020, in the U.S. Patent and Trademark Office, and Korean Patent Application No. 10-2020-0080372 filed on Jun. 30, 2020, in the Korean Intellectual Property Office, the entire disclosures of which are incorporated herein by reference for all purposes.

BACKGROUND

1. Field

The following description relates to a method and apparatus with an accelerator.

2. Description of Related Art

As artificial intelligence (AI) technology develops, a need for independent hardware solely for AI is increasing. AI may perform inference and learning through operations or computations. Thus, various devices are being developed as hardware dedicated to the implementation of AI.

Such dedicated hardware for AI may be embodied by, for example, a central processing unit (CPU) and a graphics processing unit (GPU), or by a field-programmable gate array (FPGA) and an application-specific integrated circuit (ASIC) that may be repurposed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of operating an accelerator includes receiving a request for preemption during an execution of a first task using one or more processing elements included in the accelerator, moving context information of the first task stored in an internal memory of the accelerator to an external memory of the accelerator in response to the request for preemption, and executing a second task associated with the request for preemption using the processing elements.

The context information of the first task may include an operation result obtained from an operation performed in the processing elements based on the first task.

The moving of the context information of the first task may include moving, to the external memory, an operation result stored in an on-chip memory of the accelerator after being obtained as a series of operations associated with the first task being performed in the processing elements before the request for preemption is received, and an intermediate operation result stored in an intermediate buffer of the accelerator after being obtained as a portion of the operations being performed.

The moving of the context information of the first task may include moving, to the external memory, an operation result stored in the on-chip memory of the accelerator after being obtained as a remaining portion of the operations being performed with respect to the intermediate operation result stored in the intermediate buffer of the accelerator when the request for preemption is received.

The method may further include, based on a movement time for the context information of the first task and on an expected execution time for a target instruction of the first task suspended by the request for preemption, determining whether to execute the target instruction during the moving of the context information to the external memory.

The movement time may be determined based on a size of the context information and a bandwidth between the internal memory and the external memory.

The expected execution time may be determined based on the target instruction of the first task and a size of an operand of the target instruction.

When the target instruction in the first task is for a subsequent instruction, the determining may include determining whether to execute the target instruction and the subsequent instruction based further on an expected execution time for the subsequent instruction.

In response to a determination to execute the target instruction corresponding to an in-place operation, the method may further include storing a result of the in-place operation in an address of the external memory in which an operand of the in-place operation is stored.

The executing of the second task may include starting the execution of the second task within a range in which a resource conflict does not occur before the execution of the first task is completely ended, in response to the request for preemption.

A start point of the execution of the second task may be determined based on a start point of an instruction being executed in the first task and a resource expected to be used by the instruction, or determined based on resource usage information of a resource used by the instruction being executed in the first task.

The request for preemption may be determined based on either one or both of a priority and an execution time of each of a plurality of tasks for which execution is requested.

When the execution of the second task is completed, the method may further include resuming the execution of the first task by moving, to the internal memory, the context information of the first task stored in the external memory.

The first task may include either one or both of an inference and a learning of a deep neural network (DNN).

When the first task is the learning of the DNN, the moving may include moving, to the external device, an operation result of an operation performed in the processing elements based on the first task, and a parameter of the DNN.

The method may further include recording state information of the first task preempted in response to the request for preemption.

The execution of the first task may be suspended before the moving of the context information of the first task stored in the internal memory of the accelerator to the external memory of the accelerator.

A non-transitory computer-readable storage medium may store instructions that, when executed by one or more processors, configure the one or more processors to perform the method.

In another general aspect, an accelerator includes one or more processing elements configured to execute an assigned task, an internal memory configured to store therein context information of the assigned task, and a preemption module configured to, in response to a request for preemption received during an execution of a first task in the processing elements, move context information of the first task stored in the internal memory to an external memory of the accelerator, and to execute a second task associated with the request for preemption in the processing elements.

The preemption module may be further configured to suspend the first task before the moving of the context information of the first task stored in the internal memory.

In still another general aspect, an electronic device includes an accelerator configured to, in response to a request for preemption received during an execution of a first task using one or more processing elements, move context information of a first task stored in an internal memory to an external memory, and execute a second task associated with the request for preemption using the processing elements, and the external memory configured to store therein the context information of the first task transferred from the accelerator.

Other features and aspects will be apparent from the following detailed description, the drawings, and the claims.

Figure 1:
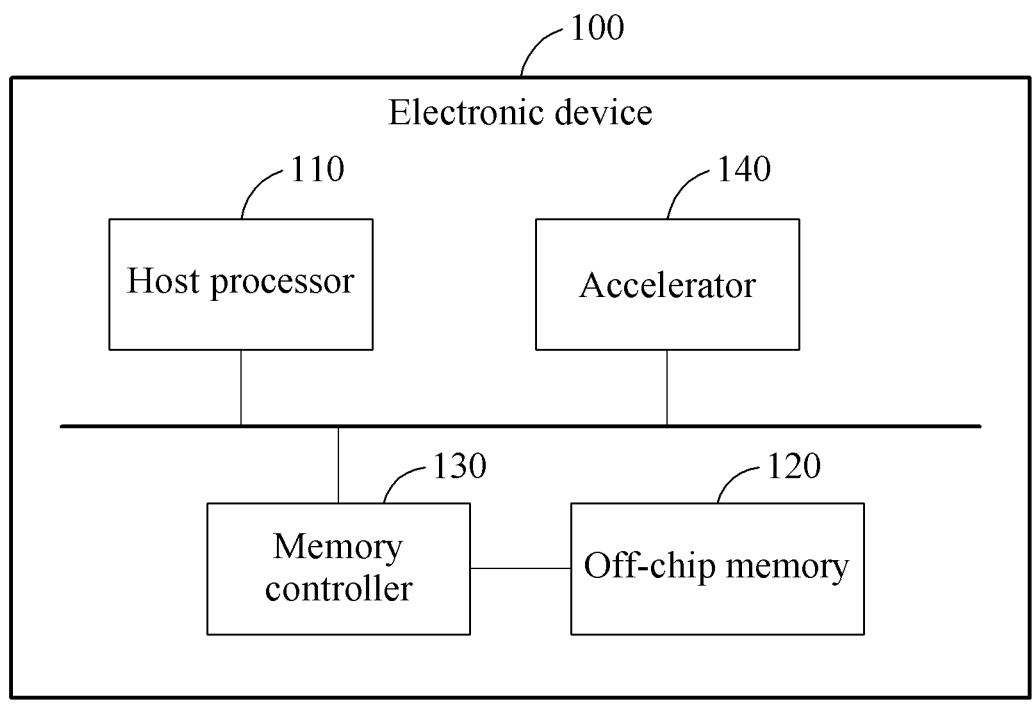
FIG. 1 is a diagram illustrating an example of an electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 is a diagram illustrating an example of an electronic device.

In FIG. 1, an electronic device 100 includes a host processor 110, an off-chip memory 120, a memory controller 130, and an accelerator 140. Such components included in the electronic device 100 may communicate with one another through a bus.

The host processor 110 may be a device configured to control respective operations of the components included in the electronic device 100 and include a central processing unit (CPU), for example. The host processor 110 may receive a request for executing a neural network-based inference task in the accelerator 140 and transfer one or more instructions to the accelerator 140 in response to the received request. The request may be made for neural network-based data inference, and for obtaining a result of the data inference by allowing the accelerator 140 to execute a neural network for speech recognition, machine translation, machine interpretation, object recognition, pattern recognition, computer vision, or the like.

The off-chip memory 120 may be a memory disposed outside the accelerator 140 and may include, for example, a dynamic random-access memory (DRAM) used as the main memory of the electronic device 100 and a non-transitory memory. The off-chip memory 120 may be accessible through the memory controller 130. The off-chip memory 120 may store at least one of an instruction to be executed in the accelerator 140, parameters of the neural network, or input data to be inferred, and data stored in the off-chip memory 120 may be transferred to the accelerator 140 when an inference task is performed in the accelerator 140. In addition, the off-chip memory 120 may be used in an example in which an on-chip memory inside the accelerator 140 is not sufficient to execute the neural network in the accelerator 140.

The off-chip memory 120 may have a larger memory capacity than the on-chip memory in the accelerator 140. However, a cost for the accelerator 140 accessing the off-chip memory 120 may be greater than a cost for access to the on-chip memory. Such a memory access cost may indicate an amount of power and/or processing time that is required for accessing a memory and then reading or writing data from or in the memory.

The accelerator 140 may be an artificial intelligence (AI) accelerator configured to execute the neural network according to an instruction of the host processor 110 and infer data to be input, and be a separate processor distinguished from the host processor 110. The accelerator 140 may be embodied as a neural processing unit (NPU), a graphics processing unit (GPU), a tensor processing unit (TPU), a CPU, or the like.

The neural network may include a plurality of layers. In an example, the neural network may include an input layer, a plurality of hidden layers, and an output layer. Each of the layers may include a plurality of nodes each referred to as an artificial neuron. Each of the nodes may indicate an operation unit having at least one input and output, and the nodes may be connected to one another. A weight may be set for a connection between nodes and be adjusted or changed. The weight may be a parameter that determines the influence of a related data value on a final result by increasing, decreasing, or maintaining the data value. To each node included in the output layer, weighted inputs of nodes included in a previous layer may be input. A process in which weighted data is input from a layer to a subsequent layer of the layer may be referred to as propagation.

The accelerator 140 may process a task that is more effectively processed by a separate dedicated processor, for example, the accelerator 140, than by the host processor 110 used for general purposes based on the characteristics of operations of the neural network. Here, one or more processing elements (PEs) and the on-chip memory that are included in the accelerator 140 may be used. A PE may be a device configured to perform an operation or computation associated with a received instruction, and include an operation unit, for example, a streaming multiprocessor (SM), a floating-point unit (FPU), or the like. The on-chip memory may include, for example, a static random-access memory (SRAM), as a scratchpad memory accessible through an address space. An inference task of the neural network may be a task of analyzing a characteristic of input data by executing or performing operations of the neural network using the input data and a parameter of the neural network. Here, results obtained by performing the operations, hereinafter simply referred to as operation results, may be stored in the on-chip memory. According to examples, an intermediate buffer may be included in the accelerator 140. The intermediate buffer may store intermediate operation results obtained by performing some of the operations. The intermediate operation results may be temporarily stored in the intermediate buffer and then be transferred to the PEs for a subsequent operation.

The accelerator 140 may perform one or more inference tasks that have different priorities. For a relatively higher-priority task, a fast response may be required. Thus, while a relatively lower-priority task is being executed in the accelerator 140, the execution may be suspended, and the higher-priority task may need to be executed preferentially. To resume the execution of the suspended task starting from a point at which the task was suspended, context information of the suspended task may be moved to the off-chip memory 120. By controlling tasks executed in the accelerator 140 based on preemption-based scheduling, it is possible to effectively satisfy latency requirements for a high-priority task while maintaining a high level of overall system throughput.

Hereinafter, example embodiments will be described in detail with reference to the accompanying drawings.

Figure 2:
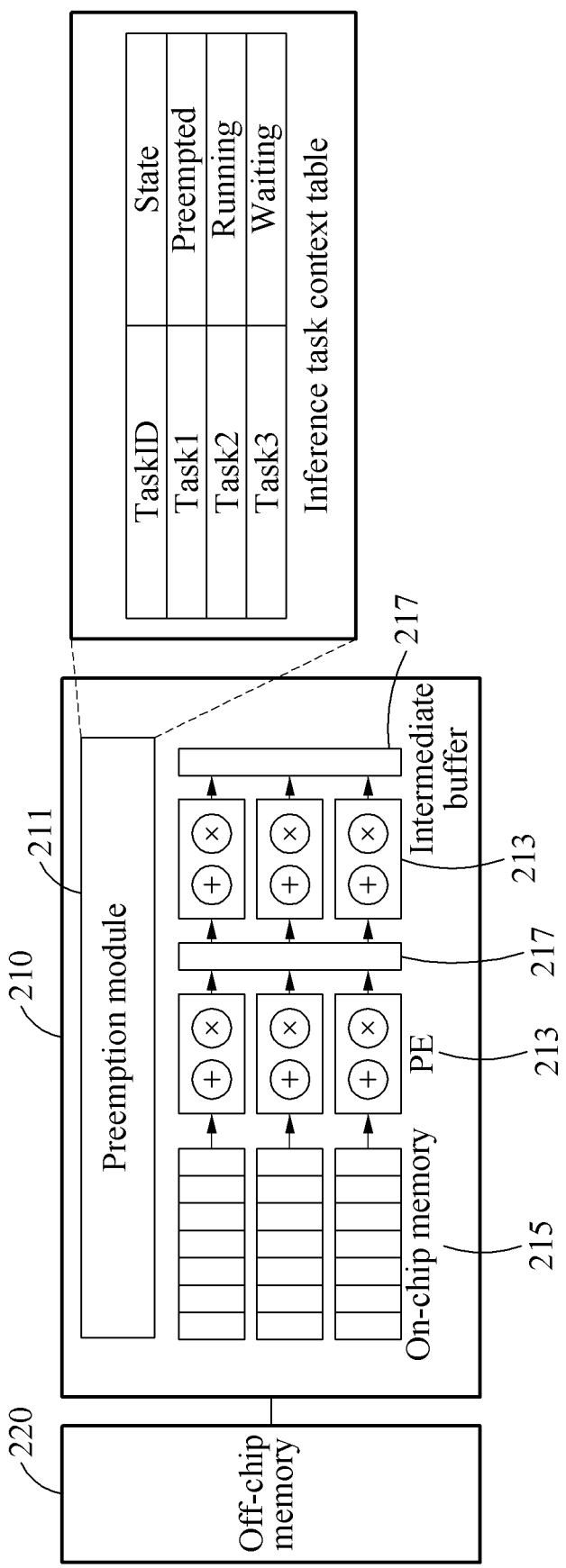
FIGS. 2 and 3 are diagrams illustrating an example of an operation of an accelerator in response to a request for preemption.
Figure 3:
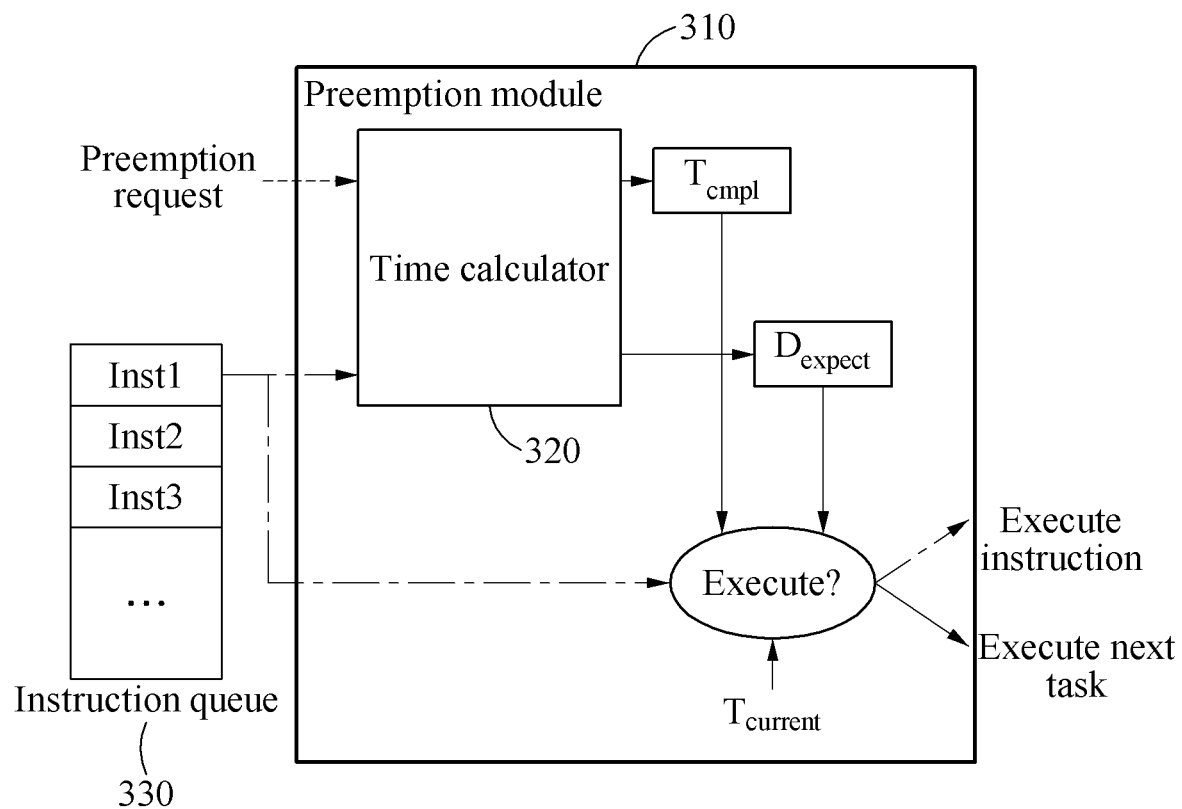

FIGS. 2 and 3 are diagrams illustrating an example of an operation of an accelerator in response to a request for preemption.

In the example of FIG. 2, illustrated are an accelerator 210 and an off-chip memory 220.

In FIG. 2, the accelerator 210 includes a preemption module 211, a PE 213, an on-chip memory 215, and an intermediate buffer 217. In some examples, the intermediate buffer 217 may not be included in the accelerator 210. However, for the convenience of description, an example in which the intermediate buffer 217 is included in the accelerator 210 will be described hereinafter.

The PE 213 may perform one or more operations associated with a task assigned to the accelerator 210. For example, the PE 213 may perform a series of operations based on input data stored in the on-chip memory 215 and a parameter of a neural network. Here, an intermediate operation result obtained by performing a portion of the operations may be stored in the intermediate buffer 217. In addition, the PE 213 may perform a remaining portion of the operations, with respect to the intermediate operation result stored in the intermediate buffer 217. A result obtained by performing the remaining portion may be stored in the on-chip memory 215.

The preemption module 211 may control tasks to be executed in the accelerator 210 based on a request for preemption received from a scheduler. Here, the request for preemption will be simply referred to as a preemption request. The preemption module 211 may suspend a first task that is currently being executed and move context information of the first task to an off-chip memory 220, which is an external memory of the accelerator 210. For such data movement, a memory request may be generated. The context information of the first task may include an operation result obtained by performing an operation in the PE 213, which is an output activation value calculated in the PE 213, in data stored in the on-chip memory 215 and/or the intermediate buffer 217. However, in an example of an inference task, a weight may be maintained the same, and thus a weight stored in the on-chip memory 215 or the intermediate buffer 217 may not be moved to the off-chip memory 220. In addition, the input data, which is a target for the inference task, is already stored in the off-chip memory 220, and thus the input data may not be moved to the off-chip memory 220. The weight or the input data may not be moved to the off-chip memory 220 as described above, and it is thus possible to minimize the cost for unnecessary data movement.

In an example, when the preemption request is received, the preemption module 211 may move output activation values stored in the on-chip memory 215 and the intermediate buffer 217 to the off-chip memory 220. That is, an operation result that is obtained by performing a series of operations associated with the first task, by the PE 213, until the preemption request is received and is stored in the on-chip memory 215, and an intermediate operation result that is obtained by performing some of the operations and is stored in the intermediate buffer 217 may be moved to the off-chip memory 220. In such a way, it is possible to simply embody a control logic for preemption processing.

In another example, when an operation result that is obtained by performing a remaining operation with respect to the intermediate operation result stored in the intermediate buffer 217 and is stored in the on-chip memory 215 when the preemption request is received, the preemption module 211 may move the operation result stored in the on-chip memory 215 to the off-chip memory 220. In such a way, it is possible to simply embody a data path of the accelerator 210 because a data path from the intermediate buffer 217 to the off-chip memory 220 is not needed.

When the context information of the first task currently being executed is moved to the off-chip memory 220, in response to the preemption request, and then a task state changes, the preemption module 211 may record the changed task state in an inference task context table. For example, a state of the first task for which execution is suspended, in response to the preemption request, may be recorded as "preempted," and a state of a second task for which execution is started, in response to the preemption request, may be recorded as "running." A state of a third task that is not changed, in response to the preemption request, may be maintained as "waiting."

When the execution of the second task associated with the preemption request is completed, the preemption module 211 may refer to the inference task context table and move the context information of the first task for which the execution is suspended to the on-chip memory 215 and/or the intermediate buffer 217 to allow the first task to be executed again starting from a point at which the first task was suspended.

Although the foregoing description is mainly based on an inference task, the description is also applicable to the accelerator 210 performing learning. In an example performs learning, a weight may change. Thus, when the preemption request is received, the weight (or a parameter of the neural network), in addition to an operation result obtained from the PE 213, may be moved to the off-chip memory 220. Through this, a high level of throughput and the satisfaction of each task latency requirement may be expected from the accelerator 210 for the learning.

In an example, to maintain a high utilization rate of the accelerator 210, a start point of the second task associated with the preemption request may be controlled. The accelerator 210 may start the execution of the second task before the first task currently being executed is completely suspended. For example, when operations to be performed in the accelerator 210 are classified by a plurality of stages, the execution of the second task may be started before the execution of the first task is completed within a range in which a resource conflict does not occur. In this example, when the operations to be performed in the accelerator 210 are performed in a multiply-accumulate (MAC) operator and a pooling operator in sequential order, and data associated with the first task is being processed in the pooling operator after being processed in the MAC operator, the execution of the second task may be started even before the processing of the data in the pooling operator is completely ended and data associated with the second task may be fed to the MAC operator to be processed in the MAC operator.

For example, the start point of the execution of the second task may be determined based on a start point of an instruction being executed in the first task and on a resource expected to be used by the instruction. Alternatively, the start point of the execution of the second task may be determined based on resource usage information of a resource used by the instruction being executed in the first task. Through this, preemption-based scheduling may effectively prevent a reduction in the utilization rate of the accelerator 210.

In FIG. 3, illustrated is an example of additionally performing an operation associated with a first task even during data movement in response to a preemption request to maintain a high utilization rate of an accelerator.

A predetermined amount of time may be used to move, to off-chip memory, context information of a first task for which execution is suspended in response to a preemption request. When any task is not executed in an accelerator for such a predetermined amount of time, a utilization rate of the accelerated may be considerably affected thereby. Thus, by executing a target instruction in the first task that is supposed to be executed subsequently in the accelerator within such a movement time of the context information, it is possible to maintain a high utilization rate of the accelerator.

In an example, when a preemption request is received by a preemption module 310, a time calculator 320 may calculate a movement time $D_{xfer}$ that is used to move context information of a first task to off-chip memory. The movement time $D_{xfer}$ may be determined based on (size of the context information)/(a bandwidth between internal memory and the off-chip memory). The internal memory may include an on-chip memory and/or an intermediate buffer. According to examples, a latency between the internal memory and the off-chip memory may be added to the movement time $D_{xfer}$. The time calculator 320 may determine a movement completion time $T_{cmpl}$ by adding a current time $T_{current}$ to the movement time $D_{xfer}$.

In addition, the time calculator 320 may calculate an expected execution time $D_{expect}(inst)$ of a target instruction that is supposed to be subsequently performed in the first task suspended, in response to the preemption request. The expected execution time $D_{expect}(inst)$ may be determined based on the target instruction and a size of an operand of the target instruction. For example, an operation complexity associated with the target instruction or an operand data access cost may be considered.

The preemption module 310 may determine an expected execution completion time $T_{expect}$ by adding a current time $T_{current}$ to the expected execution time $D_{expect}(inst)$. In addition, when the expected execution completion time $T_{expect}$ arrives before the movement completion time $T_{cmpl}$, that is, when the execution of the target instruction is completed before the context information is moved to the off-chip memory, the preemption module 310 may determine to execute the target instruction while moving the context information to the off-chip memory. However, when the expected execution completion time $T_{expect}$ arrives after the movement completion time $T_{cmpl}$, that is, when the execution of the target instruction is completed after the context information is moved to the off-chip memory, the preemption module 310 may determine not to execute the target instruction, but to execute a second task associated with the preemption request.

In an example, the target instruction to be subsequently performed in the first task may be for a subsequent instruction. For example, a target instruction Inst1 in an instruction queue 330 of the first task may be associated with data movement for a subsequent operation, for example, data movement from the off-chip memory to the on-chip memory, and a subsequent instruction Inst2 may be associated with the performance of an operation on the moved data. In this example, when only the data movement associated with the target instruction Inst1 is performed, and the operation associated with the subsequent instruction Inst2 is not performed, the target instruction Inst1 may need to be executed again to execute the subsequent instruction Inst2. That is, the target instruction Inst1 may become effective only when the subsequent instruction Inst2 is executed altogether, and thus an expected execution time of the subsequent instruction Inst2 may also need to be considered. For example, an expected execution completion time $T_{expect}$ that is determined based on an expected execution time D expect (Inst1) of the target instruction Inst1, an expected execution time $D_{expect}$(Inst2) of the subsequent instruction Inst2, and a current time $T_{current}$ may be compared to a movement completion time $T_{cmpl}$. In this example, in a case in which the subsequent instruction Inst2 is also effective only when a subsequent instruction Inst3 is performed, an expected execution time $D_{expect}$(Inst3) of the subsequent instruction Inst3 may be also be considered.

In addition, in an example in which the target instruction corresponds to an in-place operation of which an operation result is to be stored in an original storage space, and it is determined to execute the target instruction during the movement of the context information to the off-chip memory, a result of the in-place operation may be stored in an address of the off-chip memory in which an operand of the in-place operation is stored due to the movement of the context information. That is, when an operation result of an operation by an additionally executed instruction is the same in an address as a portion of data already transferred to the off-chip memory, the operation result may be stored in the same address to overwrite the portion of the data. For example, the in-place operation may correspond to an activation layer, a pooling layer, and the like that are included in a neural network. Through this, it is possible to effectively save space of the off-chip memory while increasing the utilization rate of the accelerator.

Figure 4:
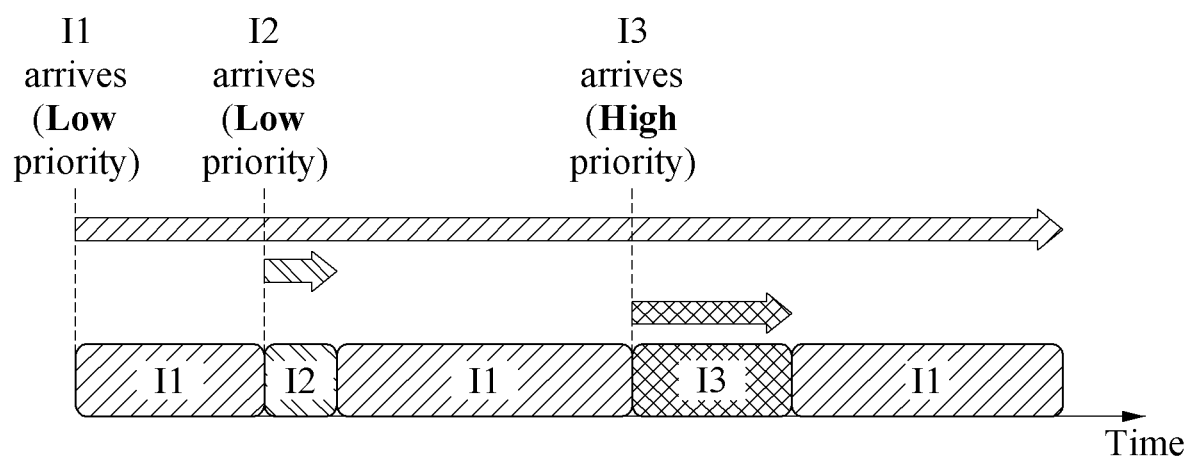
FIG. 4 is a diagram illustrating an example of preemption-based scheduling.

FIG. 4 is a diagram illustrating an example of preemption-based scheduling.

In FIG. 4, illustrated is an example of executing a first task I1, a second task I2, and a third task I3 by preemption-based scheduling. An operation associated with a neural network, a memory access operation, and an architecture of an accelerator performing the operations may be fixed and predictable. Based on such a characteristic, a model that predicts the size of each inference task, for example, network-wide deep neural network (DNN) execution time, may be obtained. Such a prediction model may be used for the preemption-based scheduling described above.

In the example of FIG. 4, the first task I1 may have a relatively low priority and a relatively long execution time, and the second task I2 may have a relatively low priority and a relatively short execution time. In this example, when the second task I2 is requested while the first task I1 that is previously requested is being executed, the preemption-based scheduling may be applied such that the second task I2 having a short execution time despite the same level of priority as the first task I1 is preferentially processed. When the second task I2 is processed rapidly, the execution of the first task I1 may be resumed starting from a point at which the first task I1 is suspended. Subsequently, when the third task I3 having the high priority is requested, the preemption-based scheduling may be applied such that the execution of the first task I1 is suspended again, and the third task I3 is preferentially processed. Subsequently, the execution of the first task I1 may be resumed starting from a point at which the first task I1 is suspended. Such preemption-based scheduling may effectively reduce an overall system latency without at the expense of throughput.

Figure 5:
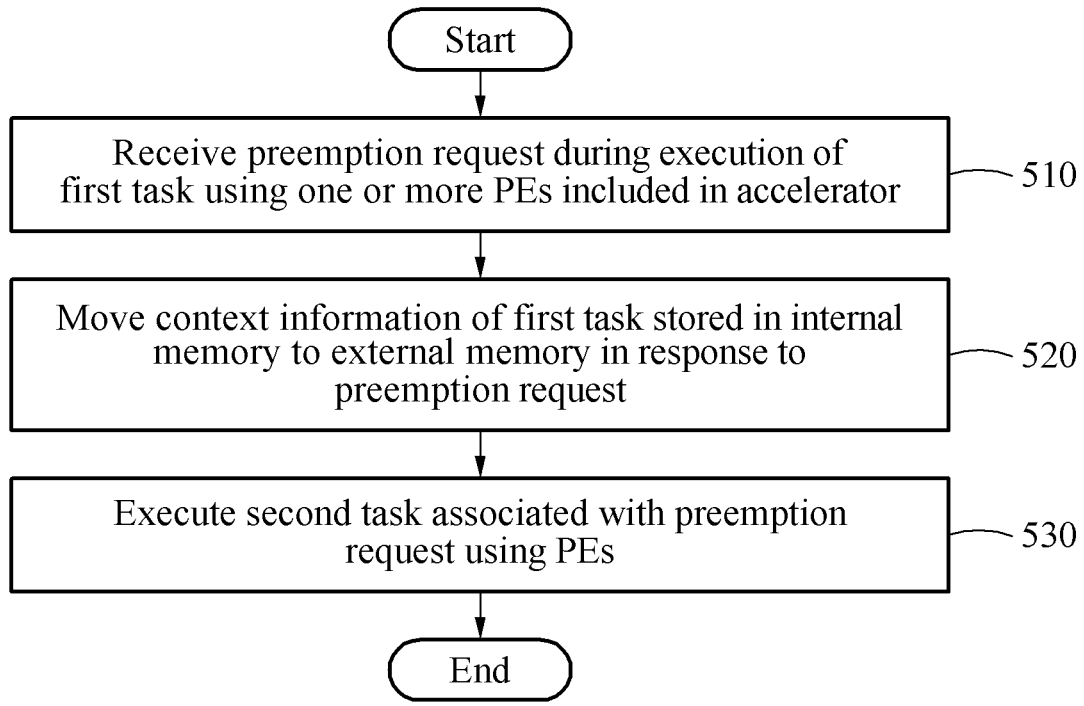
FIG. 5 is a flowchart illustrating an example of a method of operating an accelerator.

FIG. 5 is a flowchart illustrating an example of a method of operating an accelerator.

Hereinafter, how an accelerator operates will be described with reference to FIG. 5.

In operation 510, the accelerator receives a preemption request during an execution of a first task using one or more PEs included in the accelerator.

In operation 520, the accelerator moves context information of the first task stored in an internal memory of the accelerator to an external memory of the accelerator, in response to the preemption request. The context information of the first task may include an operation result of operations performed by the PEs.

In an example, the accelerator may move, to the external memory, an operation result that is obtained by performing a series of operations associated with the first task by the PEs until before the preemption request is received and is stored in an on-chip memory of the accelerator, and an intermediate operation result that is obtained by performing some of the operations and is stored in an intermediate buffer of the accelerator. In addition, the accelerator may move, to the external memory, an operation result that is obtained by performing a remaining operation with respect to the intermediate operation result stored in the intermediate buffer when the preemption request is received, and is then stored in the on-chip memory of the accelerator.

In an example, the accelerator may determine whether to execute a target instruction of the first task that is suspended, in response to the preemption request, during the movement of the context information to the external memory, based on a movement time of the context information of the first task and an expected execution time of the target instruction of the first task.

In operation 530, the accelerator executes a second task associated with the preemption request using the PEs. For example, in response to the preemption request, the accelerator may start the execution of the second task within a range in which a resource conflict does not occur before the execution of the first task is completely ended.

When the second task's execution is completed, the accelerator may resume the execution of the first task by moving the context information stored in the external memory to the internal memory.

A preemption module may be added to the accelerator. Thus, the accelerator may allow context information of a task currently being executed to be stored in the off-chip memory, thereby executing another task preferentially. Such a type of accelerator may enable flexible scheduling, and thus provide a fast response to a user. The accelerator may be provided in a cloud server system, or in an embedded system or mobile hardware, to be used therein. The preemption module may perform its function by being embodied as a separate hardware module or a portion of hardware included in the accelerator, such as a controller.

For a more detailed description of the operations described above with reference to FIG. 5, reference may be made to what has been described above with reference to FIGS. 1 through 4, and thus a more detailed and repeated description will be omitted here for brevity.

Figure 6:
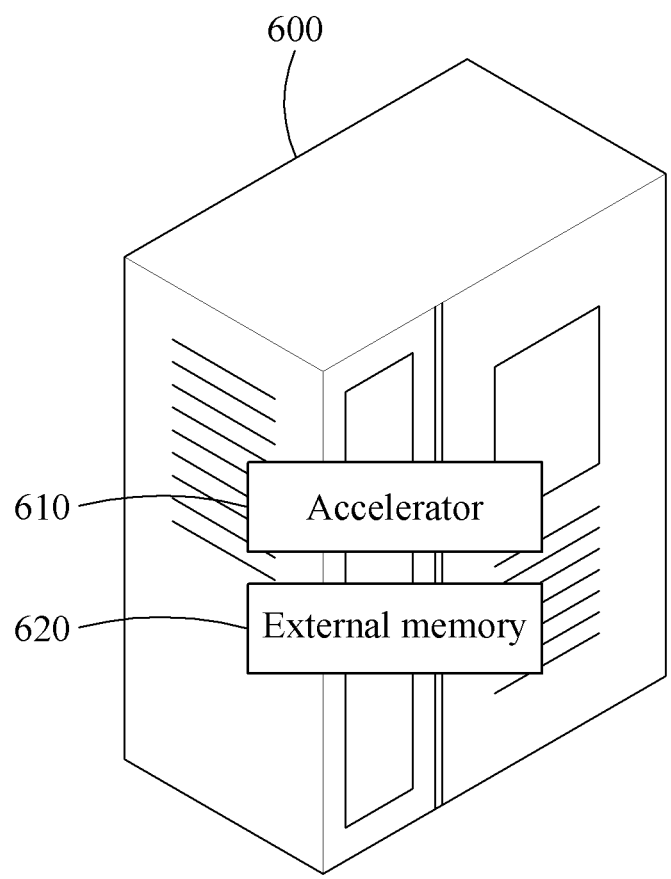
FIGS. 6 and 7 are diagrams illustrating examples of an electronic device.
Figure 7:
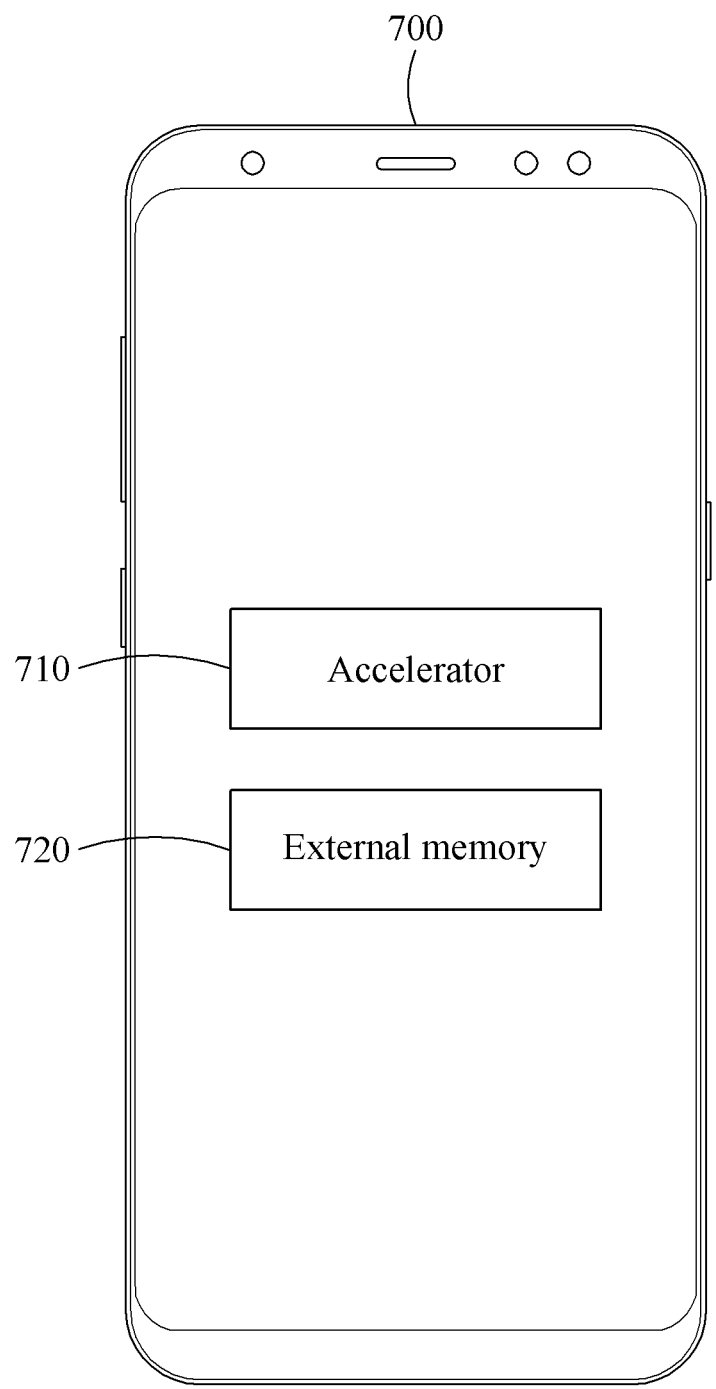

FIGS. 6 and 7 are diagrams illustrating examples of an electronic device.

In FIG. 6, an electronic device may be embodied as a server 600. The server 600 may refer to a separate device distinguished from a user terminal controlled by a user, and may communicate with one or more user terminals through a wired and/or wireless network. The server 600 may receive inference requests that are simultaneously transmitted from multiple users through their user terminals. An accelerator 610 may execute one or more tasks based on the preemption-based scheduling described above. For example, when a preemption request for a second task having a higher priority and/or a considerably short execution time is received during an execution of a first task, the accelerator 610 may move context information of the first task to an external memory 620 and then execute the second task preferentially. When the execution of the second task is completed, the accelerator 610 may resume the execution of the first task using the context information stored in the external memory 620, starting from a point at which the first task is suspended. The server 600 may return inference results to respectively corresponding user terminals. A user terminal described herein may include, for example, a computing device such as a smartphone, a personal computer (PC), a tablet PC, and a laptop, a wearable device such as a smartwatch and smart eyeglasses, a home appliance such as a smart speaker, a smart TV, and a smart refrigerator, and other devices such as a smart vehicle, a smart kiosk, and an Internet of things (IoT) device.

In FIG. 7, an electronic device may be embodied as a user terminal 700. Although the user terminal 700 is illustrated as a smartphone in FIG. 7 for the convenience of description, any device controlled by a user may be applicable without limitation. The user terminal 700 may obtain inference requests directly from a user and execute a task determined through the preemption-based scheduling in an accelerator 710. When a preemption request is received, context information of a task being executed may be stored in an external memory 720. Inference results of the task executed through the preemption-based scheduling may be provided to a user, or a subsequent operation of the user terminal 700 that is based on the inference results may be performed.

The host processor 110, accelerator 140, memory controller 130, off-chip memory 120, 220, accelerator 210, preemption module 211, PE 213, on-chip memory 215, intermediate buffer 217, preemption module 310, and time calculator 320 in FIGS. 1-7 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of operating an accelerator, the method comprising:
   receiving a request for preemption during an execution of a first task using one or more processing elements comprised in the accelerator;
   in response to the request for preemption, moving context information of the first task stored in an internal memory of the accelerator to an external memory of the accelerator, including determining whether to execute a target instruction of the first task, which is requested to be suspended, during the moving of the context information to the external memory; and
   executing a second task associated with the request for preemption using the processing elements.

2. The method of claim 1, wherein the context information of the first task comprises an operation result obtained from an operation performed in the processing elements based on the first task.

3. The method of claim 1, wherein the moving of the context information of the first task comprises:
   moving, to the external memory, an operation result stored in an on-chip memory of the accelerator after being obtained as a series of operations associated with the first task being performed in the processing elements before the request for preemption is received, and an intermediate operation result stored in an intermediate buffer of the accelerator after being obtained as a portion of the operations being performed.

4. The method of claim 1, wherein the moving of the context information of the first task comprises:
   moving, to the external memory, an operation result stored in an on-chip memory of the accelerator after being obtained as a remaining operation being performed with respect to an intermediate operation result stored in an intermediate buffer of the accelerator when the request for preemption is received.

5. The method of claim 1, further comprising:
   based on a movement time for the context information of the first task and on an expected execution time for a target instruction of the first task suspended by the request for preemption, determining whether to execute the target instruction during the moving of the context information to the external memory.

6. The method of claim 5, wherein the movement time is determined based on a size of the context information and a bandwidth between the internal memory and the external memory.

7. The method of claim 5, wherein the expected execution time is determined based on the target instruction of the first task and a size of an operand of the target instruction.

8. The method of claim 5, wherein, when the target instruction in the first task is for a subsequent instruction, the determining comprises:
   determining whether to execute the target instruction and the subsequent instruction based further on an expected execution time for the subsequent instruction.

9. The method of claim 5, in response to a determination to execute the target instruction corresponding to an in-place operation, further comprising:
   storing a result of the in-place operation in an address of the external memory in which an operand of the in-place operation is stored.

10. The method of claim 1, wherein the executing of the second task comprises:
    in response to the request for preemption, starting the execution of the second task within a range in which a resource conflict does not occur before the execution of the first task is completely ended.

11. The method of claim 10, wherein a start point of the execution of the second task is determined based on a start point of an instruction being executed in the first task and a resource expected to be used by the instruction, or the start point of the execution of the second task is determined based on resource usage information of a resource used by the instruction being executed in the first task.

12. The method of claim 1, wherein the request for preemption is determined based on either one or both of a priority and an execution time of each of a plurality of tasks for which execution is requested.

13. The method of claim 1, when the execution of the second task is completed, further comprising:
resuming the execution of the first task by moving, to the internal memory, the context information of the first task stored in the external memory.

14. The method of claim 1, wherein the first task comprises either one or both of an inference and a learning of a deep neural network (DNN).

15. The method of claim 1, wherein, when the first task is learning of a deep neural network (DNN), the moving comprises:
moving, to the external device, an operation result of an operation performed in the processing elements, based on the first task, and a parameter of the DNN.

16. The method of claim 1, further comprising:
recording state information of the first task preempted in response to the request for preemption.

17. The method of claim 1, wherein the execution of the first task is suspended before the moving of the context information of the first task stored in the internal memory of the accelerator to the external memory of the accelerator.

18. A non-transitory computer-readable storage medium storing instructions that, when executed by one or more processors, configure the one or more processors to perform the method of claim 1.

19. An accelerator comprising:
one or more processing elements configured to execute an assigned task;
an internal memory configured to store therein context information of the assigned task; and
a preemption module configured to, in response to a request for preemption received during an execution of a first task in the processing elements, move context information of the first task stored in the internal memory to an external memory of the accelerator, including determining whether to execute a target instruction of the first task, which is requested to be suspended, during the moving of the context information to the external memory, and execute a second task associated with the request for preemption in the processing elements.

20. The accelerator of claim 19, wherein the preemption module is further configured to suspend the first task before the moving of the context information of the first task stored in the internal memory.

21. An electronic device comprising:
an accelerator configured to, in response to a request for preemption received during an execution of a first task using one or more processing elements, suspend the first task and move context information of the first task stored in an internal memory to an external memory, including determining whether to execute a target instruction of the first task, which is requested to be suspended, during the moving of the context information to the external memory, and execute a second task associated with the request for preemption using the processing elements; and
the external memory configured to store therein the context information of the first task transferred from the accelerator.

* * * * *